Dec. 22, 1942.　　　F. FIEDLER　　　2,305,806
HYDRAULIC BRAKE
Filed Aug. 3, 1940
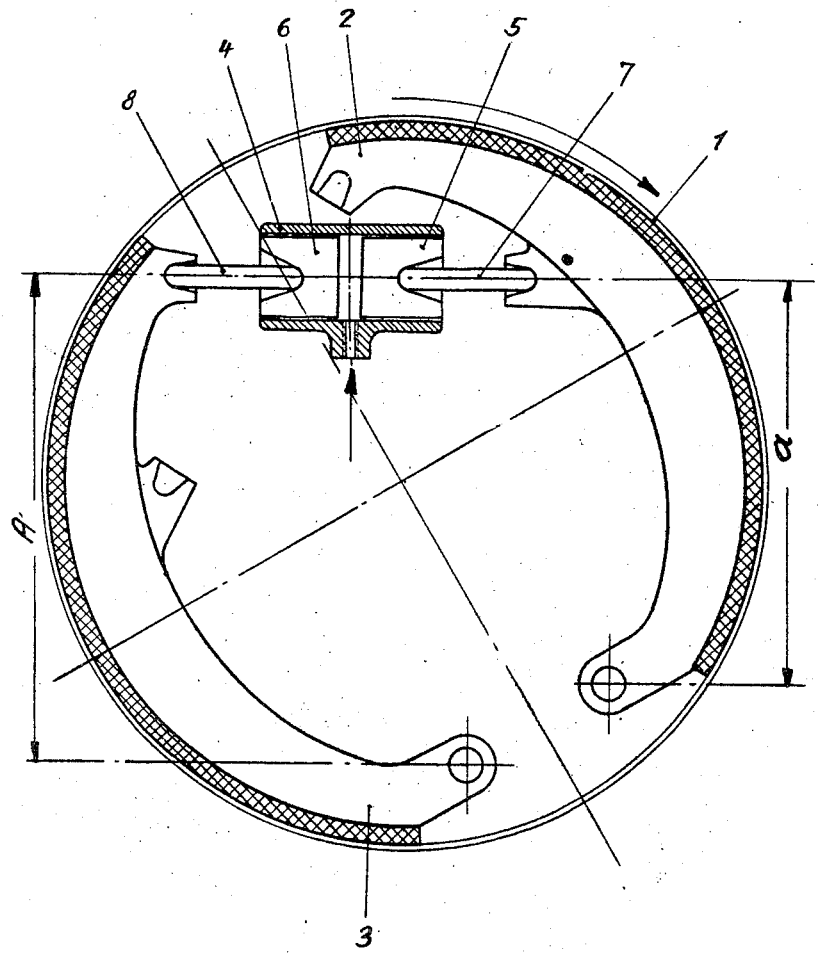
INVENTOR
Fritz Fiedler
BY
ATTORNEYS Patented Dec. 22, 1942

2,305,806

UNITED STATES PATENT OFFICE 2,305,806

HYDRAULIC BRAKE

Fritz Fiedler, Munich, Germany; vested in the Alien Property Custodian

Application August 3, 1940, Serial No. 350,734
In Germany July 22, 1939

5 Claims. (Cl. 188—78)

The invention relates to internal shoe brake systems for automotive vehicles and particularly to those of the hydraulic or pneumatic type.

It is known, that in internal shoe brakes of the kind, in which both brake shoes are arranged symmetrically to each other for pivoting about separate fixed fulcrum points in such a manner that, provided a definite direction of rotation of the brake drum, one brake shoe is running-on the drum, whilst the other is running-off the drum, so that wear is more rapid with one brake shoe lining than with the other. This different degree of wear of the two brake shoe linings is conditioned by the fact that, owing to the frictional force appearing on application of pressure and producing a predetermined torque with respect to its point of action, the brake shoe running-on the drum is applied with greater force against the brake drum than the other brake shoe, which is influenced in the sense of unloading the brake.

To eliminate this different wearing of the brake shoe linings, requiring their premature replacement, it has been proposed, in connection with hydraulic or pneumatic brakes, to design the brake cylinder with different diameters. In this case the smaller piston is intended for the running-on brake shoe, whilst the larger piston is provided for the running-off brake shoe. This arrangement brings about the disadvantage that the manufacture of brake cylinders with a stepped bore is much more expensive than of those with a uniform bore. There is further the necessity of providing pressure pistons of different diameters requiring a larger stock of pistons, packing rings and the like.

To eliminate these drawbacks the invention proposes means assuring in a simple manner a uniform application of the brake shoes on the brake drum and therewith a uniform wear of the brake shoe linings.

According to the invention, the brake cylinder for actuating the brake shoes is provided with a uniform bore and arranged in such a manner, that both pressure pistons act upon the two otherwise symmetrical brake shoes, yet with lever arms of different length. The leverage can be so fixed by a corresponding arrangement of the brake cylnder that during operation of the brake system a complete equalisation of the pressure applied on the two brake shoe linings is obtained, thus providing the fundamental preliminary conditions for a uniform wearing of both brake shoe linings.

One form of the arrangement, according to the invention, is shown by way of example in the accompanying drawing.

The arrow in the drawing indicates the direction of rotation of the brake drum 1. The running-on brake shoe is 2, whilst the other brake shoe, submitted to the unloading effect of the frictional force, has reference numeral 3. The brake cylinder 4 with its uniform internal bore contains the pistons 5 and 6 acting through struts 7 and 8 on the brake shoes. The pressure piston 5, the action of which is augmented by the frictional force, acts upon the brake shoe 2 through the shorter effective lever arm a, whilst the pressure piston 6 acts through the longer effective lever arm A upon brake shoe 3, which is unloaded by the frictional force. As the force exerted by the two pressure pistons is of course the same, the torque exerted on the two brake shoes is, provided the brake drum being at a standstill, in consequence of the different length of the effective lever arms, likewise different. By a corresponding proportioning of the effective lever arms, there can easily be realised that a thoroughly uniform application pressure is exerted on the two brake shoe linings in the case of the rotating drum, i. e., during operation, thus assuring a uniform wearing of both brake shoe linings.

The two brake shoes are preferably so designed as to be interchangeable, and are each provided with two suitably constructed sockets for being engaged with the struts 7 and 8 of the pistons.

I claim:

1. A brake, comprising in combination a drum, a pair of brake shoes adjacent said drum each having one end movable and the other end supported by an abutment, said brake shoes being arranged symmetrically with respect to each other with their respective movable ends adjacent so that one brake shoe is of the running on and the other of the running off type, means for moving said movable ends in opposite directions for applying the brake shoes to the drum, said moving means exerting the same force in opposite directions and acting upon said brake shoes at different distances from their supported ends, whereby a smaller torque is applied to the running on shoe than to the running off shoe whereby braking effect will be applied to each of said shoes.

2. A brake, comprising in combination a drum, a pair of brake shoes adjacent said drum each having one end movable and the other end supported by an abutment, said brake shoes being arranged symmetrically with respect to each other with their respective movable ends adjacent so that one brake shoe is of the running on and the other of the running off type, means for moving said movable ends in opposite directions for applying the brake shoes to the drum, said moving means exerting the same force in opposite directions acting upon the running on shoe at a less distance from its supported end than its point of action on the running off shoe, whereby a smaller torque is applied to the running on shoe than to the running off shoe and equal braking effect will be applied to each of said shoes.

3. A brake, comprising in combination a drum, a pair of brake shoes within said drum each having one end movable and the other end supported by an abutment, said brake shoes being arranged symmetrically with respect to each other with their respective movable ends adjacent so that one brake shoe is of the running on and the other of the running off type, hydraulic means for spreading said movable ends apart for applying the brake shoes to the drum, said spreading means exerting the same force in opposite directions and bearing upon the running on shoe at a less distance from its supported end than its bearing point upon the running off shoe whereby a smaller torque is applied to the running on shoe than to the running off shoe and equal braking effect will be applied to each of said shoes.

4. A brake, comprising in combination a drum, a pair of identical brake shoes within said drum having at least one end movable each being provided with two operating means receiving seats one near its movable end and one removed from its movable end, said brake shoes being arranged symmetrically with respect to each other with their respective movable ends adjacent so that one brake shoe is of the running on and the other of the running off type, means for spreading said movable ends apart for applying the brake shoes to the drum, said spreading means exerting the same force in opposite directions and having means cooperating with the end receiving seat of the running off brake shoe and the other receiving seat of the running on brake shoe, whereby a smaller torque is applied to the running on shoe than to the running off shoe and equal braking effect will be applied to each of said shoes.

5. As an article of manufacture, a brake shoe provided with means adjacent one end thereof for anchoring said shoe and having two non-parallel shoe actuator receiving seats, one adjacent the end thereof opposite said anchoring means and inclined at an angle of less than 90° to a line from said seat to said anchoring means, and the other between said anchoring means and said first mentioned seat being arranged at an angle of more than 90° to a line from said second seat to said anchoring means, whereby the seat nearer the anchoring means may receive a spreading device bearing against the further seat of a similar companion shoe, or the seat further from the anchoring means may receive a spreading device bearing against the nearer seat of such a companion shoe.

FRITZ FIEDLER.